US005578119A

United States Patent [19]

Short et al.

[11] Patent Number: 5,578,119

[45] Date of Patent: Nov. 26, 1996

[54] MOLDABLE SCULPTING MEDIUM

[75] Inventors: Robert E. Short; E. Glenn Tickner, both of Los Gatos, Calif.

[73] Assignee: Microsome, Sunnyvale, Calif.

[21] Appl. No.: 465,967

[22] Filed: Jun. 6, 1995

[51] Int. Cl.[6] .......................... C09K 3/00; C08L 101/00; C08L 5/04; C08L 1/28

[52] U.S. Cl. ............................... 106/287.35; 106/287.22; 106/287.24; 106/287.25; 106/287.28; 106/287.3; 106/287.34; 106/409; 106/163.01; 106/168.01; 106/171.1; 106/172.1; 106/205.01

[58] Field of Search ................................ 106/196, 197.1, 106/197.2, 208, 209, 287.22, 287.24, 287.25, 287.28, 287.3, 287.34, 287.35, 409

[56] References Cited

U.S. PATENT DOCUMENTS

| | | | |
|---|---|---|---|
| 3,919,110 | 11/1975 | Vassiliades et al. | 106/409 |
| 4,171,228 | 10/1979 | Lowery | 106/409 |
| 5,310,421 | 5/1994 | Shapero et al. | 106/208 |

FOREIGN PATENT DOCUMENTS

| | | | |
|---|---|---|---|
| 57-0004224 | 1/1982 | Japan | 106/409 |

*Primary Examiner*—David Brunsman
*Attorney, Agent, or Firm*—Fish & Richardson P.C.

[57] ABSTRACT

A sculpting medium is provided comprising a filler of polymeric microspheres and optionally, a fibrous filler, a thixotropic hydrogel binder and water, all blended in a proportion such that the color of the medium is due primarily to the color(s) of the polymeric medium.

22 Claims, No Drawings

MOLDABLE SCULPTING MEDIUM

The present invention relates to a modeling compound for use as a sculpting medium both by children and the serious artist and as a hobby material which can be molded into specific shapes and forms and, when dry, machined with low-force devices. One element of the present invention relates to a moldable material composed of polymeric spheres, preferably hollow, which are permanently dyed to desired coloration serving as a filler material, and an undyed water soluble, low-tack binder having very low viscoelastic properties. Optionally, the mixture includes a fibrous filler in low concentration to add texture and improve cohesion. In the moldable state, the material exhibits greater adherence to itself than other materials and surfaces, and therefore does not contaminate clothing, carpets, furniture and other items. Upon drying, the present invention resists cracking and distortion and provides a lightweight and durable sculpture having unique color properties and an interesting tactile surface.

BACKGROUND OF THE INVENTION

A common sculpting medium is clay, which is of mineral origin and comes either in water-based or oil-based form. Water-based clays are typically used by the artist or craftsperson to fashion pottery or small figurines. Drying of such objects is a tedious process so that the result is free of cracks. Firing is required to insure permanency. Water-based clays generally do not come in a range of colors except those which are the natural coloration of the mineral filler, typically gray or rust brown. Coloration must be applied to the surface after firing and it too must generally undergo a second firing to preserve the color. After completion, the article is heavy, fragile, and brittle. Oil-based clays are produced in a range of malleabilities and often come in a range of colors. These products, however, are non-drying and incorporate pigments which can stain textiles, carpeting, furniture, and other surfaces.

Another class of modeling compound is of vegetable origin. Some incorporate starch as the filler and are primarily intended for children. Such doughs have low viscoelasticity, are easily malleable, and come in various colors. Because it is the binder that is pigmented, color brightness is generally lacking. Further, surfaces, particularly carpets and other textiles, are easily stained. The dough, once it is in a carpet, is very difficult to remove. Starch based doughs are unsuitable for fashioning permanent sculptures as drying induces considerable distortion and cracking of the finished object. Cellulose fiber is another material of vegetable origin which has been used as a filler in modeling doughs. Often blended with other mineral fillers, these doughs are reasonably suited for dried sculptures, albeit with some shrinkage and distortion occurring while the sculpted object is drying. These compounds are generally available only in gray or white. Use of this material is difficult since it is very tacky (sticky) and lacks cohesion in the wet state.

Another class of sculpting medium is polymer based. One such formulation incorporates polyvinyl chloride as the filler. Formation of a permanent sculpture usually requires a curing process at elevated temperature, which causes the material to release toxic gases. The material itself is somewhat toxic and is not suitable for use by children without adult supervision. Another product formulation is composed essentially of hollow polyvinylidene chloride microspheres combined within a gelled polyvinyl alcohol binder. It is lightweight and dries with relatively little shrinkage, and due to its viscoelastic properties, it is resilient and bounceable. A viscoelastic material combines both fluid and elastic properties, but viscoelasticity compromises its utility as a sculpting medium. Having an elastic component, the material is difficult to shape in the precise detail intended by the sculptor. Increasing the water content reduces this property but dramatically increases its tackiness, i.e., its tendency to stick to the hands and other surfaces. Coloration is normally accomplished with pigments which are blended into the binder, but these pigments can cause staining on textiles and other surfaces coming into contact with the material.

U.S. Pat. No. 5,157,063 discloses polystyrene foam beads, 1–2 mm in diameter as a filler and a mixture of polyvinyl alcohol, polyvinyl acetate glycerin and xanthan gum as the binder. The use of gelled polyvinyl alcohol/acetate produces a viscoelastic material and therefore tends to rebound. The rebounding attributes contribute a negative effect on the product as the material tends to return to its initial position.

U.S. Pat. No. 5,171,766 discloses a moldable composition comprising polyvinyl alcohol, water, a gellant and a filler of plastic microspheres having a wettable particulate coating. The preferred gellant is sodium tetraborate. The gelled polyvinyl alcohol base produces a dough which is viscoelastic. A wettable particulate coating is required to insure that the filler is retained with the binder.

SUMMARY OF THE INVENTION

The present invention relates to a sculpting medium comprising a filler of polymeric microspheres, preferably hollow, which are permanently dyed and a water soluble polymeric binder having low viscoelastic properties. Optionally, the medium may also comprise a fibrous material in low concentration as an adjuvant filler for improved cohesion. In wet form, the medium is a sculpting material. If formed and dried, further shaping by cutting and sanding is possible.

The spheres are permanently dyed to provide the color to the medium. However, the binder is colorless thereby giving rise to its non-staining nature. Colored spheres, usually larger than 100 microns, empower the sculptor to create innovative art objects with a different surface. Spheres can be dyed nearly any color. However, spheres incorporating dyes of the three colorant primaries along with black and white can be commingled to provide all hues, values, and chromas giving an attractive mottled appearance. The assemblage of colored spheres in close proximity has been termed "digital color". The eye integrates the individual colors to form a third color. For example, magenta (red) and yellow placed close together forms an orange to the eye. Yet under microscopic examination, the individual colors are clearly seen. It should be an excellent tool to instruct art students. The black and white spheres added to the mix permits darkening or brightening of the color but does not change the hue.

Hollow bubbles are preferred as the filler in sculpting media due to their low mass, particularly after drying. The thin-walled bubbles yields a low mass medium. A light medium is easier to work with, especially important for small children who exhibit lower hand strength. This can be particularly appropriate for very large sculpted objects where the differences in structural mass is obvious or for shapes of aircraft having aerodynamic features suitable for gliding through the air. Also, the hollow nature of the bubbles allows for a small amount of material to fill a relatively large volume which makes the art and craft medium more cost effective.

Preferably, the spheres are in the range of 50 to 600 microns because they are easier to manipulate and require less moisture. Upon drying there is less shrinkage with little or no cracking, as compared, for example, to sculpting clays, which can have 1 micron particles.

A variety of binders can be used in so far as they are water soluble, possess low tack, and exhibit low viscoelasticity. The sodium salts of carboxymethyl cellulose (CMC) and algenic acid are particularly effective because they can be formulated into a self-standing thixotropic gel at relatively low concentrations and are non-sticky. Self-standing gel refers to its ability to resist deformation under its own weight. Thixotropic behavior is a property of certain gels which liquify and thereby deform when subjected to shear forces and then solidify into the gel state again when left standing. Because carboxymethyl cellulose and algenic acid polymers form low tack or non-sticky gels, the sculpting compound tends not to cake on the hands, fingers, and other surfaces when worked yet exhibit good cohesion thereby maintaining the polymeric microspheres within the sculpting medium. The low viscoelasticity of these gels allow the sculptor to apply detail to his or her sculpture without the encumbrance of the materials elasticity which tends to return the shape to its original form. Once dried these binders provide a highly cohesive and durable sculpture which can be subsequently sanded, carved or machined if desired. The exterior surface exhibits an unusual tactile and visual appearance owing to the presence of the bubbles.

An advantage of the present invention is the capability of the dried medium to be reconstituted after it is fully dried. Unlike the starch based modeling doughs and those containing gelled polyvinyl alcohol as the binder, this sculpting medium can be easily returned to its "wet" state by simple addition of water. This is of particular utility when, for example, the container has been left open and the unused portion has been exposed to the ambient for a period of time. Soaking the material in water will restore its original state with no loss of physical properties. In its wet state, a particularly useful sculpting composition will contain 60 to 80% by weight of water.

Still another advantage of this material is the capability of arresting or controlling the curing (drying) process by placing the sculpture in an air-tight container or bag, or by wrapping the structure with a water impermeable barrier. Thus a sculpting in progress can be temporarily terminated without damage or distortion and then restarted at a more favorable time without detrimental effects to the sculpture.

Fibrous material may optionally form a component of the present invention as an ancillary filler. Preferably, the fibrous material will comprise 2 to 5% of the total volume of the medium, but typically can comprise up to 10% by weight of the medium. This addition provides several modifications to the formulation. First, the fibers serve to increase the cohesion of the components of the medium while in the "wet" state. Second, they improve the strength of the sculpted object in the "dry" state. Third, the fibers alter the surface texture and permit some control over the finish by increasing surface matte. Paper pulp fibers are particularly effective as the fibrous filler, although other fibrous materials such as synthetic textile fibers may also be utilized.

Humectants may be a component of the medium. The humectant will plasticize the binder, if desired. There are a variety of humectants compatible with the binder resins including glycerin and the glycols. Typical proportion are up to 10% by weight of humectant in the medium.

The sculpting medium according to the invention may be premixed in the wet state as is common for such products. It may also be offered in a dehydrated state, as for example dried flakes or kernels, where the user adds the water. The dehydrated state is advantageous due to its long shelf life and lower transportation costs compared to the wet formulation.

A desirable additive that increases shelf life of the material in the moist state is an antimicrobial agent. A variety of such materials having relatively low toxicity is available commercially including the polyparabens, sodium benzoate, sodium propionate, and the sorbate salts. Typically, up to 2% by weight of the medium may be used.

DESCRIPTION OF THE PREFERRED EMBODIMENTS

The sculpting medium of the present invention comprises 1) a filler of polymeric spheres, preferably hollow, which have been permanently colored and, optionally, a fibrous material, 2) a water soluble resin binder which can be formulated into a thixotropic gel, has low tack and low viscoelastic properties, and 3) water. Other ingredients such as a humectant and an antimicrobial agent may optionally be included.

The polymeric spheres are permanently dyed or pigmented to the desired colorant. The types of dyes and/or pigments used depend upon the type of polymer but are well known to those versed in the art. Although the polymeric spheres may be dyed to any color, the preferred embodiment is the creation of spheres of the three colorant primaries of magenta (red), cyan (blue), and yellow and black and white. From these five all the other hues, values, and chromas thereof can be obtained by mixing the formulated doughs and thereby giving rise to the "digital color" aspect of the invention.

The sphere diameters have a preferred range of 50 to 600 microns more preferably 150 to 350 microns. Size distribution may be variable or may be uniform. Shape variations may exist but are not detrimental to the product. Even crenated spheres are acceptable. The exact sphere shapes will depend upon the technology used to produce the spheres. The apparent density of the spheres varies depending upon whether they are hollow or solid. The effective density of bubbles may range from 0.05 to 0.5 g/cc, and preferably between 0.5 and 0.3 g/cc. The density of solid spheres may range from 0.8 to 1.6 g/cc and preferably between 0.8 and 1.2 g/cc. Preferably the microspheres comprise 10 to 50% by weight of the medium. Typical useful ranges are 10 to 25% for hollow spheres and 30 to 50% for solid spheres.

A preferred sculpting medium comprises 10–25% by weight of hollow polymeric microspheres, 3–10% thixotropic hydrogel, 0–10% fibrous filler, 0–10% humectant, 0–2% preservative, 60–80% water.

The spheres may be produced from any number of plastic materials so long as the material is water insoluble and has low water absorption properties. Those with high water absorption properties, cellulose for example, are less satisfactory due to their tendency to undergo dimensional change in response to variations in water content. Common plastics which may be employed in the production of the polymeric spheres include polystyrene, polyvinyl chloride, epoxy, polyvinylidene chloride, the polyacrylics, the polyamines, and some of the various cellulose derivatives. Because of toxicity considerations, the cellulosics are preferred. These include ethyl cellulose, cellulose acetate, cellulose acetate butyrate, and cellulose acetate propionate. Cellulose nitrate is a less preferred derivative because of its flammable nature.

The filler can be produced from either solid or hollow microspheres. The spheres may be produced by several means. One technique for producing microspheres from a wide variety of materials is a method referred to as the dynamic instability method which employs flow within a needle/nozzle assembly. A jet issues from an orifice and becomes unstable. Waves are propagated along its length and amplify. The outer surface of the jet becomes sinusoidal and its amplitude increases along the length until spherical droplets are formed and released. If the process is controlled, precision droplets are produced. If gas flows within the inner nozzle, a hollow droplet (bubble) is formed. The liquid droplets are solidified in the final step either by cooling, solvent evaporation, or by coagulation depending upon the nature of the liquid precursor.

Another technique of producing microspheres is by means of emulsion solvent evaporation. Polymers which are readily soluble in a volatile solvent which is immiscible in water is compatible with this approach. The polymer is dissolved in a suitable solvent like chloroform, ether, methylene chloride, toluene, etc. The mixture is then added to an aqueous sol like acacia, CMC, PEG, gelatin, etc., adjusted to a temperature slightly below the solvents boiling point, and dispersed. The polymer solvent is then allowed to evaporate. Once the solvent has evaporated, the polymer product can be retrieved through filtration. The result is typically a mixture of solid particles and hollow encapsulated microbubbles. With proper choice of polymer solvent, aqueous sol and dispersation speed, a microbubble yield of up to 90% is achievable. Separation of microbubbles from solid microspheres is easily accomplished by decantation with the solid microbeads settling and the microbubbles rising in the liquid bath.

Still another method of producing hollow spheres from a variety of polymers is by means of spray drying a solution comprising a volatile solvent having dissolved therein a film-forming polymer and a latent gas or blowing agent. The solution is subdivided into droplets and the droplets are then subjected to a drying temperature at which the solvent is volatilized and the latent gas is converted into a gas. Details of this method can be found in U.S. Pat. No. 2,797,201.

Still another method of producing hollow microspheres is described in U.S. Pat. No. 3,615,972. Microbubbles are produced by first preparing an aqueous emulsion containing in the inner or discontinuous phase a mixture of blowing agent and organic monomeric materials suitable for polymerization. After polymerization has taken place, a polymeric sphere containing a blowing agent in its core results. Subsequent exposure to heat plasticizes the polymer sphere and gasifies the blowing agent rendering an expanded microbubble.

While the above methods typically produce microbubbles containing monocellular cores, those containing multicellular gas cores can also be used as the filler. An example of multicellular spheres is the polystyrene foam "prepuff" used in the manufacture of insulated cups, food trays, and preformed packing materials. Such spheres are generally produced in a size range exceeding that which is preferred. More importantly, bright coloration of such spheres is difficult because the puffing process renders the spheres more pastel in value.

Irrespective of the technique used to produce the microsphere whether hollow or solid, the dye or pigment is added to the bubble polymer while in the liquefied state. Thus when the microsphere has solidified the colorant is permanently locked within the sphere. Any number of dyes are useful provided that they are compatible with the polymer. White spheres will generally require a pigment filler such as a finely divided titanium dioxide, aluminum oxide, zinc oxide, or calcium carbonate dispersed uniformly within the liquefied polymer.

The binder is preferably a water soluble resin which will form a thixotropic gel, possesses low tack, and has low or no viscoelastic properties. Two preferred binders are the sodium salts of carboxymethyl cellulose and alginic acid. The higher molecular weights of these materials are preferred because a self supporting gel can be formulated at relatively lower concentrations. More preferred is the sodium carboxymethyl cellulose because it is less subject to microbial attack and is devoid of any odor. Carboxymethyl cellulose having a degree of substitution of between 0.65–0.9 is most preferred as thixotropy is reduced at higher degrees of substitution. The gel will preferably comprise 3 to 10% by weight of the medium.

An optional but preferred ancillary filler is a fibrous material to improve cohesion of the medium in the wet state and strength in the dry state, while also modifying the aesthetic characteristics of the finished sculpture. The amount of fibrous material in relation to the bubble filler is preferably small, being about 1–5% on a volume basis. A variety of fibers are suitable including the host of natural and synthetic textile fibers. Preferred is cellulose fibers derived from wood also known as paper pulp.

The medium according to the invention, can be fashioned into any number of objects that when dried form permanent art objects. The digital color aspect of the medium provides a pleasingly different aesthetic to the finished artwork as well as a useful instructional tool for understanding color. Magnets can be placed in the finished sculptures to create refrigerator magnets. The material readily accepts and holds other objects such as button eyes, feathers, and sundry items. The material, once dried, can be sanded, carved or machined so that finished sculptures may be altered. Further, the medium readily accepts water-based household glues such as Elmer's™ in both the wet and dry state allowing for a greater versatility in fashioning intricate sculptures. The material is also suitable for fashioning objects and figurines using prefabricated molds. This is particularly suitable for use by children. Such molds could be of popular cartoon figures or of jewelry. The sculpting medium is particularly appropriate for fashioning or forming objects where lightness of weight is particularly important, such as large pieces where differences in structural mass is obvious or where the encumbrance in weight is a distraction such as a face mask. The light weight material also has application for objects such as airplane gliders even with aerodynamically shaped body parts.

EXAMPLES

Example 1

A sample of 12.5 grams loose paper pulp was added to 220 milliliters water and the mixture stirred until the pulp was uniformly dispersed. To the mixture was added slowly with stirring 16.7 grams sodium carboxymethyl cellulose having a viscosity of 4,000 cp. in a one percent aqueous solution. Mixing was continued until a uniform gel-like consistency was attained. 50.0 grams blue dyed ethyl cellulose microbubbles of a size range of 75–500 microns (300 micron mean diameter) and having an average wall thickness of 10 microns was then added and kneaded into the gel mixture until the bubbles were uniformly distributed. The result was a blue sculpting compound which was non-sticky and did not flow or deform under the effect of its own weight but could be molded into desired shapes by application of finger pressure and exhibited no elastic memory.

Example 2

A sample of 2.0 grams sodium alginate (14,000 cp. in a 2% aqueous solution) was added to 25 milliliters of water and thoroughly mixed until a uniform gel-like consistency was attained. 5.9 grams black dyed ethyl cellulose bubbles of a size range of 75–500 microns (300 micron mean diameter) and having an average wall thickness of 10 microns was then added and kneaded into the gel mixture until the bubbles were uniformly dispersed. The result was a black sculpting compound which was non-sticky and did not flow or deform under its own weight but could be molded into desired shapes by application of finger pressure and exhibited no elastic memory.

Example 3

The sculpting compound produced in accordance with Example 1 was kneaded together with an equal amount of dough containing yellow bubbles produced in similar fashion until the individually colored bubbles were uniformly commingled. A figurine was then fashioned by hand and allowed to air dry. The result was a very light weight hardened figurine showing no cracks or distortion and having a pleasing mottled matte green color and interesting surface texture.

Example 4

A sample of 5.8 grams of sculpting compound produced in accordance with Example 1 was allowed to dry at room temperature overnight. Dry weight was 1.56 grams. The dried material was then broken into chunks and 4.4 grams water was added. The mixture was allowed to soak for approximately 45 minutes. The material was then kneaded by hand until smooth. The regenerated mixture was virtually identical in color, texture, and workability to that of the material in its original state.

Example 5

Approximately 3 grams of a commercially available starch based modeling dough was mashed and smeared with thumb pressure onto a sample swatch of a nylon carpet having a random loop and cut pile weave.

After the procedure, it was evident that the dough had intimately adhered to the fibers of the carpet. Attempts at removing the dough were unsuccessful. The same procedure was carried out with the sculpting medium prepared in accordance with Example 1. It was found that the compound would not adhere to the carpet despite repeated smearing attempts. The remaining residual left on the carpet after the medium was removed was easily brushed away. No staining of the carpet was evident.

Example 6

The sculpting compound produced in accordance with Example 1 was rolled into a cylinder approximately 1 inch in diameter and approximately 4.5 inches long, and allowed to air dry for 2 days. The cylinder was not made smooth or regular to the surface and was not perfectly cylindrical. The dried cylinder was chucked up in to small Unimat lathe and machined to form a leg of an antique chair at approximately 30 RPM. The material machined exceptionally well and maintained its shape and stability throughout the machining process. The machined part maintained its dimensional stability and shape and also its hardness following machining showing its utility as a workable, machinable material.

Example 7

The sculpting compound in accordance with Example 1 was placed in a 10 ml plastic hypodermic syringe. A smooth integral thread of approximately ⅛ inch in diameter was extruded by thumb pressure on the syringe. The threads while still in the moist form could be coiled, twisted or tied into an overhand and square knot. The thread dried rapidly maintaining the configured shape.

Example 8

The sculpting material in accordance with Example 1 was placed into a silastic mold of a cartoon character and pressed firmly to fill all the interior voids. Excess material was removed so that the material was flush with the mold. Two ¼ inch refrigerator magnets were then pressed into the material approximately 1 inch from each end and centered. The molded part was removed from the mold by plying the silastic mold away from the molded part. The part was then allowed to dry at room conditions over night. The final part bore an exact replica of the cartoon character and the magnets were completely bonded to the back side demonstrating that the material could be molded to form refrigerator magnets. The figurine was placed upon the refrigerator door where it became firmly affixed thereby demonstrating the lightness of the finished product.

Example 9

Several cubic centimeters of red, yellow, and black sculpting compound produced in accordance with Example 1 was kneaded together thoroughly to form a "digital" brown color. A 4 inch model of a wooden chair was then fashioned from the resulting compound by first separately forming the components of the chair. The four chair legs were produced by extrusion through a ¼ inch diameter tube using a hypodermic syringe. The leg cross braces were likewise formed using ⅛ inch diameter tubing. The chair seat and back components were fashioned by hand. The various chair components, 12 separate pieces in all, were allowed to dry overnight. Once dried, the components were assembled using Elmer's™ Glue-all by applying a small amount to the joining surfaces and holding in place for approximately 20 seconds. After release, the joints remained affixed and stable. No fixturing or clamping was required as the assembly was completed. The glue was cured after air drying for about 3 hours. The result was a miniature chair serving to demonstrate that component parts fashioned from the sculpting compound can be readily and easily joined with glue to fashion sculptures of increased complexity.

What is claimed is:

1. A colored water-based moldable sculpting medium comprising:

a filler comprising permanently colored polymeric microspheres, a thixotropic hydrogel binder; and blended in a proportion that the color of said medium is primarily due to colors of the polymeric microspheres.

2. The sculpting medium according to claim 1 wherein said binder is colorless.

3. The sculpting medium according to claim 1 wherein said microspheres are hollow.

4. The sculpting medium according to claim 3 wherein said microspheres are composed of a material selected from the group consisting of ethyl cellulose, cellulose acetate, cellulose acetate butyrate, cellulose acetate propionate, polystyrene, polyvinyl chloride, polyvinylidene chloride, silicates, polyacrylics, polyamines, polyesters, an epoxy, or mixtures of two or more thereof.

5. The sculpting medium according to claim 3 wherein at least some of said microspheres have the colors magenta, cyan or yellow.

6. The sculpting medium according to claim 3 wherein at least some of said microspheres are white or black.

7. The sculpting medium according to claim 3 wherein said microspheres possess a mean diameter in the range of 50 to 600 microns.

8. The sculpting medium according to claim 3 wherein said microspheres have a monocore gas interior.

9. The sculpting medium according to claim 3 wherein said microspheres have a multicore gas interior.

10. The sculpting medium according to claim 3 wherein said thixotropic hydrogel is sodium alginate, sodium carboxymethyl cellulose or a mixture of the two.

11. The sculpting medium according to claim 3 wherein at least some of said microspheres have the colors red, blue or yellow.

12. The sculpting medium according to claim 1 further comprising a fibrous filler comprising no more than 10% by volume of said medium.

13. The sculpting medium according to claim 12 wherein said fibrous filler is a cellulose derivative, polyester, nylon, polyethylene terephthalate, alone or in combination.

14. The medium according to claim 1 comprising:

| | |
|---|---|
| Polymeric microspheres | 10–50% by weight |
| Thixotropic hydrogel | 3–10% |
| Fibrous ancillary filler | 0–10% |
| Humectant | 0–10% |
| Preservative | 0–2% |
| Water | 60–80%. |

15. A medium according to claim 14 wherein said microspheres comprise hollow polymeric microspheres.

16. A medium according to claim 15 wherein said hollow polymeric microspheres comprise 10 to 25% by weight of said medium.

17. A medium according to claim 14 wherein said microspheres comprise solid polymeric microspheres.

18. A medium according to claim 17 wherein said solid polymeric microspheres comprise 30 to 50% by weight of said medium.

19. A medium according to claim 1 wherein said hydrogel binder comprises sodium carbomethyl cellulose, sodium alginate, or a combination thereof.

20. The sculpting medium according to claim 19 further comprising an ancillary fibrous filler comprising no more than 10% by volume of said composition.

21. The sculpting medium according to claim 20 wherein said filler is a cellulosic derivative polyester, nylon, polyethylene terephthalate, alone or in combination.

22. A sculpting medium according to claim 1 wherein said hydrogel binder is also colored.

* * * * *